Patented July 17, 1923.

1,462,163

UNITED STATES PATENT OFFICE.

THEODOR BRAFF, OF VIENNA, AUSTRIA, ASSIGNOR OF ONE-HALF TO JOSEPH BRAFF, OF CLEVELAND, OHIO.

FOOD PRODUCT AND METHOD OF MAKING SAME.

No Drawing.   Application filed August 12, 1922.   Serial No. 581,496.

*To all whom it may concern:*

Be is known that I, THEODOR BRAFF, a citizen of Austria, and a resident of Vienna, Austria, have invented a new and useful Improvement in Food Products and Methods of Making Same, of which the following is a specification, the principle of the invention being herein explained and the best mode in which I have contemplated applying that principle, so as to distinguish it from other inventions.

This invention relates to a food product made from prepared vegetable fat and to the method of making the same. More particularly it comprises the combining vegetable fat with an edible oil, preferably also of vegetable origin, and with onions or some similar plant, the juice of which has both flavoring and preservative qualities, to the end that a food preparation may result which closely resembles natural goose grease or chicken grease.

It has heretofore been attempted to modify vegetable fat by means of an essence derived from animal tissue so as to give it a special flavor and physical characteristics. It has been found, however, that where the main base of the preparation is an animal fat or where the ingredients mixed therewith are largely of animal origin, that the resulting preparation is of less digestible character than where the entire preparation is made solely of natural or artificial ingredients of vegetable origin. Such resulting food product is also less palatable and deteriorates more rapidly than a food product made solely of elements derived from non-animal sources. It has also been found possible, by adding the ingredients hereinafter named, to make a product very closely resembling natural goose grease and having a flavor and physical characteristics similar thereto but of much superior keeping qualities. The product may be made less dense and in such condition closely resembles chicken grease. In both its heavier and lighter form this preparation may be used in the various processes of cooking food and it may also be used as a substitute for butter for table use, making a very palatable combination when placed upon bread.

In addition to the advantages resulting from the improved palatability, digestibility and preservative qualities, which are found in this preparation, it may be more economically manufactured than food products derived from animal sources.

To the accomplishment of the foregoing and related ends, the invention, then, consists of the ingredients hereinafter fully described and particularly pointed out in the claims, the following description setting forth in detail one approved combination of ingredients embodying my invention and the process of making the same, such disclosed article and method constituting, however, but one of various forms in which the principle of the invention may be used.

The base of the preparation comprises natural vegetable fat or prepared vegetable fat, for example, cacao butter, coconut oil, cotton-seed stearine, hydrogenized cotton-seed oil, etc. By the term "vegetable fat" is meant the solid or semi-solid products of the character above referred to as distinguished from a vegetable oil which is normally in a liquid condition. After heating a quantity of the vegetable fat in either an open or a closed vessel, until the contents of such vessel are liquefied, onions are added and roasted with said vegetable fat until the onions are cooked to a golden brown color. The quantity of onions should preferably be about one-twelfth of the quantity by weight of the vegetable fat and edible oil and may be more or less, according to the variety of onions employed and the use to which the product is to be put—cooking, baking or table use. The onions are preferably used in their raw uncooked state, but excellent results may be obtained with certain varieties of onions which have been previously cooked to a small extent.

The onions are then strained from the preparation and an edible oil, such as olive oil, is added to the filtered liquid. The oil is thoroughly mixed with the liquid and the resulting product is a solid or semi-solid mass, according to the proportions of the several ingredients employed.

Thus the use of a larger quantity of edible oil in proportion to the vegetable fat employed results in a change in the flavor and density of the product. All the various proportions utilized for different grades of product need not be set down but it is found that when a vegetable fat such as hydrogenized cotton-seed oil comprises 50 per cent by weight of the ingredients and olive oil about 38 per cent and onions about 12 per cent of the total weight of said ingredients, that a product results which is closely similar to natural goose grease in appearance and taste. When the quantity of vegetable fat is reduced to 30 per cent and the quantity of olive oil increased to 58 per cent with the quantity of onions remaining the same, (12 per cent), the product has the flavor and consistency of chicken grease.

For baking purposes it has been found that about 67 per cent of vegetable fat should be used and 38 per cent of olive oil. The remaining 5 per cent by weight may be onions or some flavoring extract such as vanilla, and lemon as desired, or the flavoring may be omitted and the quantity of olive oil used may be increased 5 per cent.

Other modes of applying the principle of my invention may be employed instead of the one explained, change being made as regards the material utilized, provided the ingredients stated by any one of the following claims or the equivalent of such stated ingredients be employed, and provided the step or steps stated in such claims or the equivalent of such stated step or steps be employed.

I therefore particularly point out and distinctly claim as my invention:—

1. An artificial goose-grease comprising a major proportion by weight of vegetable fat, a minor proportion by weight of olive oil, and a much smaller proportion by weight of the juice of onions.

2. An artificial goose-grease comprising a hydrogenized cotton-seed oil constituting by weight 50 per cent of the elements of the composition, olive oil constituting by weight approximately 38 per cent and onions constituting by weight approximately 12 per cent of the weight of the ingredients utilized for forming the composition.

3. The method of making an artificial goose-grease which comprises roasting raw onions in vegetable fat to a golden brown color, filtering the onions from said liquid, and while hot adding olive oil to the filtered liquid and stirring until the resulting product cools to a solid or semi-solid condition.

Signed by me, this 7th day of August, 1922.

THEODOR BRAFF.